United States Patent
Wang

(10) Patent No.: US 9,859,779 B2
(45) Date of Patent: Jan. 2, 2018

(54) LINEAR VIBRATOR

(71) Applicant: Changliang Wang, Shenzhen (CN)

(72) Inventor: Changliang Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 148 days.

(21) Appl. No.: 14/742,815

(22) Filed: Jun. 18, 2015

(65) Prior Publication Data

US 2016/0181903 A1    Jun. 23, 2016

(30) Foreign Application Priority Data

Dec. 23, 2014    (CN) ..................... 2014 2 0826694 U

(51) Int. Cl.
- *H02K 33/12* (2006.01)
- *H02K 33/16* (2006.01)
- *H02K 33/18* (2006.01)

(52) U.S. Cl.
CPC ............. *H02K 33/12* (2013.01); *H02K 33/16* (2013.01); *H02K 33/18* (2013.01)

(58) Field of Classification Search
CPC ......... H02K 33/16; H02K 33/12; H02K 33/18
See application file for complete search history.

(56) References Cited

U.S. PATENT DOCUMENTS

| | | | | |
|---|---|---|---|---|
| 6,844,636 B2* | 1/2005 | Lieu | .................. | G11B 19/2009 29/596 |
| 7,099,489 B2* | 8/2006 | Pan | ......................... | H04R 9/06 381/182 |
| 7,960,875 B2* | 6/2011 | Higuchi | .................. | B06B 1/045 310/15 |
| 2003/0127915 A1* | 7/2003 | Rafaelof | .............. | G11B 5/5569 310/12.21 |
| 2005/0184601 A1* | 8/2005 | Kweon | ................... | B06B 1/045 310/36 |
| 2006/0022781 A1* | 2/2006 | Kim | ....................... | H02K 33/16 335/296 |
| 2006/0091732 A1* | 5/2006 | Onishi | ................... | H02K 41/03 310/12.23 |
| 2010/0213773 A1* | 8/2010 | Dong | ..................... | H02K 33/16 310/25 |
| 2011/0018365 A1* | 1/2011 | Kim | ....................... | B06B 1/045 310/17 |
| 2013/0015725 A1* | 1/2013 | Trammell | ........... | H02K 41/031 310/12.26 |

* cited by examiner

*Primary Examiner* — Naishadh Desai
(74) *Attorney, Agent, or Firm* — Na Xu; IPro, PLLC

(57) ABSTRACT

A linear vibrator includes a stator having a housing including a receiving space therein, a moveable unit, an elastic member suspending the moveable unit in the receiving space, and a protection member located between the stator and the moveable unit. The protection member forms a first bevel along a vibration direction of the moveable unit, one of the stator and the moveable unit includes a second bevel corresponding to the first bevel. The second bevel keeps a distance from the first bevel for rubbing each other when the linear vibrator falls.

10 Claims, 2 Drawing Sheets

LINEAR VIBRATOR

FIELD OF THE INVENTION

The present invention relates to vibrators for generating tactile vibrations, more particularly to a linear vibrator used in a portable consumer electronic device.

DESCRIPTION OF RELATED ART

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibrator. Linear vibrators are widely used in consumer products and are disclosed in U.S. Pat. No. 6,466,682 B2 issued on Oct. 15, 2002, and U.S. Pat. No. 7,099,489 B2 issued on Aug. 29, 2006. The vibrator is mounted on a mounting surface of a printed circuit board, and the moving unit thereof is actuated to move along a direction perpendicular to the mounting surface. Another linear vibrator includes a moveable unit suspended by a plurality of elastic members for being movable along a direction parallel to a mounting surface of a printed circuit board from which vibration signals are transmitted.

Referring to FIG. 1, a linear vibrator 10 related to the present disclosure includes a housing, a moveable unit 11 accommodated in the housing, elastic members 12 suspending the moveable unit 11 in the housing, and cushions 13 for prevent the linear vibrator from being damaged while the linear vibrator falls. The housing includes a cover 14 and a base covering the cover. Ends of the cushions are fixed to the housing and the cushion is designed as a protrusion. When the linear vibrator falls, the moveable unit 11 forces the elastic members to deform and further strike the housing and the cushions, i.e., kinetic energy of the moveable unit transfers to the stain energy of the combination of the housing, the elastic members, and the cushion. Because the striking time is short, each of the housing, the elastic members, and the cushion will suffer great force from the moveable unit, and will be broken.

Accordingly, an improved linear vibrator enabling solving the problems mentioned above is desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to an exemplary embodiment.

Figure 1:
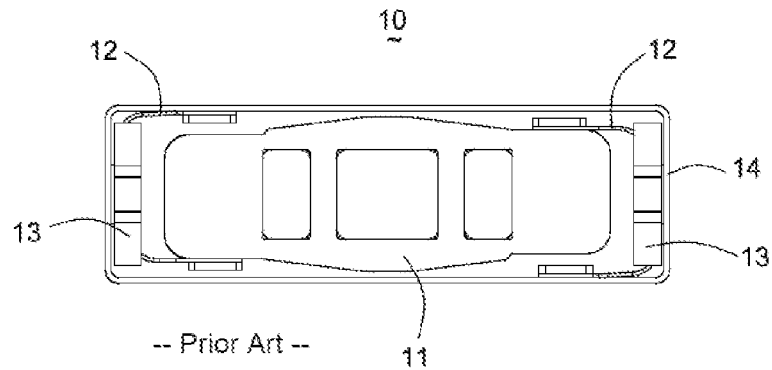
FIG. 1 is an illustration of a linear vibrator related to the present disclosure.
Figure 2:
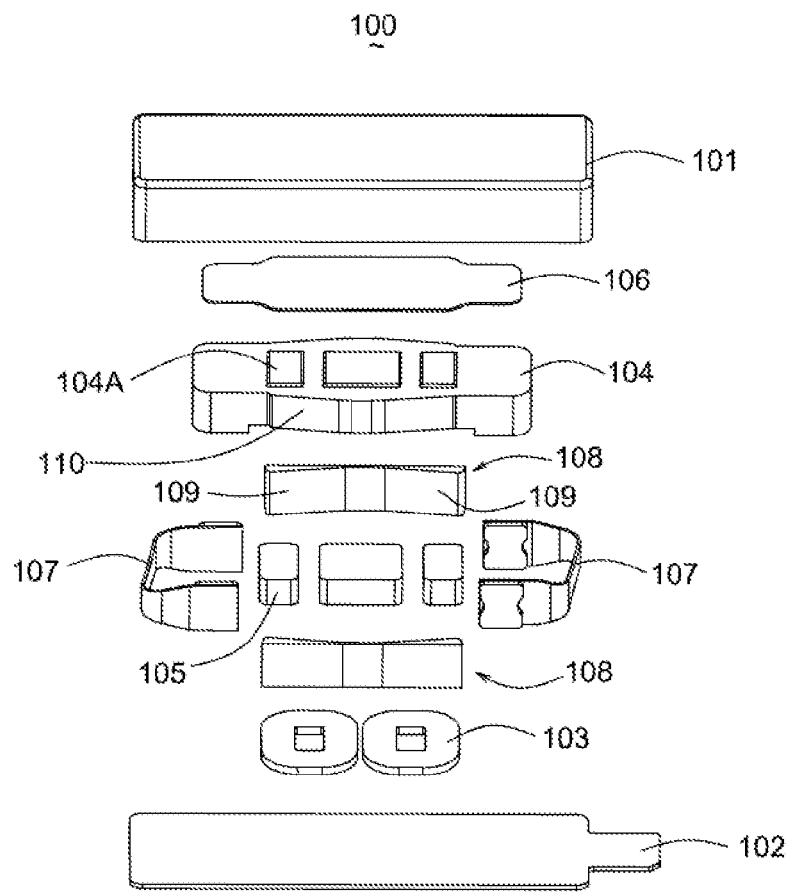
FIG. 2 is an exploded view of a linear vibrator in accordance with a first exemplary embodiment of the present disclosure.
Figure 3:
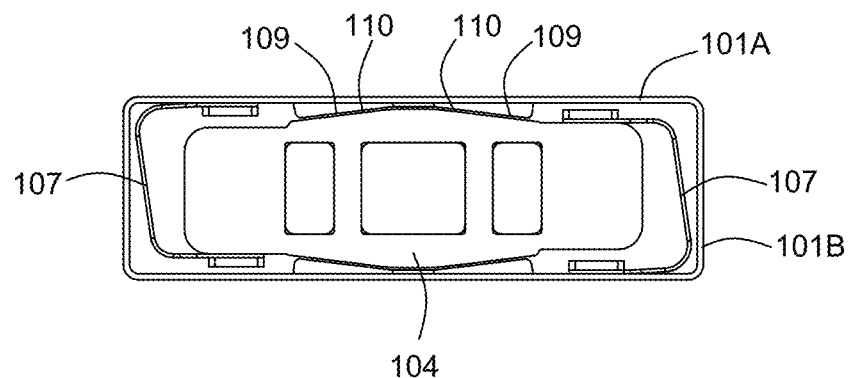
FIG. 3 is an illustration of a combination of a housing and a moveable unit of the linear vibrator in FIG. 2.

Referring to FIGS. 2-3, a linear vibrator 100 in accordance with a first exemplary embodiment of the present disclosure includes a housing having a receiving space. The housing includes a cover 101 and a base 102 engaging with the cover 101 for forming the receiving space. A coil 103 is disposed on the base 102. The cover 101 includes a first sidewall 101A parallel to a vibrating direction of the linear vibrator 100, and a second sidewall 101B perpendicular to the vibrating direction. In this embodiment, the housing and the coil 103 forms a stator of the linear vibrator. Of course, the stator may comprise other components as long as the other components are relatively fixed.

The linear vibrator 100 further includes a moveable unit. The moveable unit includes a weight 104 having a through hole 104A, a magnet 105 received in the through hole 104A of the weight 104, a pole plate 106 attached to the magnet 105, and an elastic member 107 for suspending the moveable unit in the receiving space. The magnet 105 faces and keeps a distance from the coil 103. In this embodiment, the weight 104, the magnet 105, and the pole plate 106 form a rotor of the linear vibrator 100. Of course the rotor may comprise other components as long as the other components are moveable relative to the housing. The coil 103 could be alternatively mounted in the weight 104, and the magnet 105 could be alternatively mounted on the base 102.

The linear vibrator 100 further includes a protection member 108 that is located between the first sidewall 101A and the moveable unit. Along the vibrating direction of the moveable unit, the protection member 108 includes a first bevel 109. Correspondingly, the weight 104 forms a second bevel 110 facing the first bevel 109. Extending direction of the second bevel 110 is same to that of the first bevel 109. Optionally, the protection member 108 could be positioned on the housing, and the first bevel 109 keeps a distance from the second bevel 110. The distance between the first bevel 109 and the second bevel 110 is greater than a predetermined vibration amplitude that is designed by actual requirements and is determined by the electro-magnetic force generated by the coil and the magnet assembly. Once the linear vibrator is manufactured, the predetermined vibration amplitude is determined. If the coil is provided with exceeding current, the amplitude of the moveable unit must be beyond the predetermined vibration amplitude. Or, if the linear vibrator falls, the moveable unit would also move beyond the predetermined vibration amplitude. It is understood that the predetermined vibration amplitude ensures that the moveable unit can't strike the housing.

While the linear vibrator works normally, the moveable unit will not engage with the protection member 108. While the linear vibrator falls, the first bevel 109 engages and conflicts with the second bevel 110. Part of kinetic energy of the moveable unit transfers to the strain energy of the protection member 108, the housing and the elastic member 107, and other of the kinetic energy is counteracted by the friction between the first bevel 109 and the second bevel 110. Thus, the force applied to the protection member 108, the housing, and the elastic member 107 is decreased. In order to increase the friction between the first bevel 109 and the second bevel 110, surfaces of the first and second bevels could be designed as ragged surfaces.

Figure 4:
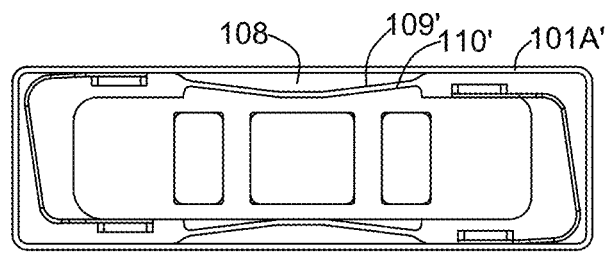
FIG. 4 is an illustration of a combination of a housing and a moveable unit of the linear vibrator in accordance with a second exemplary embodiment of the present disclosure.

Referring to FIG. 4, the protection member 108 could also be attached to the first sidewall 101A' and includes a first bevel 109'. Correspondingly, the moveable unit is provided with a second bevel 110'. While the linear vibrator works normally, the moveable unit will not engage with the protection member 108. While the linear vibrator falls, the first bevel 109' engages and conflicts with the second bevel 110'. Part of kinetic energy of the moveable unit transfers to the strain energy of the protection member 108, the housing and the elastic member 107, and other of the kinetic energy is counteracted by the friction between the first bevel 109' and the second bevel 110'. Thus, the force applied to the protection member 108, the housing, and the elastic member is decreased. In order to increase the friction between the first bevel 109' and the second bevel 110', surfaces of the first and second bevels could be designed as ragged surfaces.

The protection member could be made from different materials with different stiffness. As the friction between the first bevel and the second bevel is sliding friction, the protection member could be made from rigid materials, such as stainless steel, or duralium.

It is to be understood, however, that even though numerous characteristics and advantages of the present embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibrator, comprising:
   a stator having a housing including a receiving space therein;
   a moveable unit;
   an elastic member suspending the moveable unit in the receiving space;
   a protection member located between the stator and the moveable unit, and forming a first bevel, an extending direction of the first bevel intersecting a vibration direction of the moveable unit;
   one of the stator and the moveable unit including a second bevel corresponding to the first bevel, wherein the second bevel is parallel to the first bevel, a distance is formed from the first bevel to the second bevel along the vibration direction of the moveable unit, and the distance is greater than a predetermined vibration amplitude of the moveable unit, the first bevel and the second bevel rub against each other when the linear vibrator falls.

2. The linear vibrator as described in claim 1, wherein the protection member is located on the stator, and the first bevel thereof faces the moveable unit, the second bevel is formed on the moveable unit.

3. The linear vibrator as described in claim 2, wherein the housing includes a cover and a base engaging with the cover, the cover includes a first sidewall parallel to the vibration direction and a second sidewall perpendicular to the vibration direction, and the protection member is attached to the first sidewall.

4. The linear vibrator as described in claim 1, wherein the protection member is located on the moveable unit, and the first bevel thereof faces the stator, the second bevel is formed on the stator.

5. The linear vibrator as described in claim 1, wherein at least one of the first and second bevels is a ragged surface.

6. The linear vibrator as described in claim 1, wherein the protection member is made of different materials with different stiffness.

7. The linear vibrator as described in claim 1, wherein the protection member is made of rigid material.

8. The linear vibrator as described in claim 1, wherein the protection member is made of stainless steel or duralumin.

9. The linear vibrator as described in claim 1, wherein a surface of the protection member inclines inward from both ends thereof to provide two first bevels arranged symmetrically.

10. The linear vibrator as described in claim 1, wherein a surface of the protection member inclines outward from both ends thereof to provide two first bevels arranged symmetrically.

* * * * *